May 11, 1943.  R. H. QUILLIN  2,318,631
MASONRY DRILL
Filed Feb. 5, 1942
Fig-1-
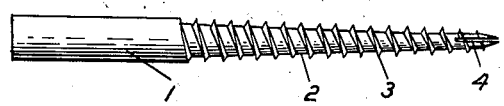
Fig-2-
Fig-3-
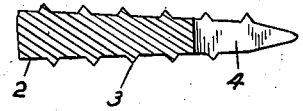
Inventor
Richard H. Quillin
Attorneys Patented May 11, 1943

2,318,631

UNITED STATES PATENT OFFICE 2,318,631

MASONRY DRILL

Richard H. Quillin, Aberdeen Proving Ground, Md.

Application February 5, 1942, Serial No. 429,691

1 Claim. (Cl. 255—69)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved drill for forming holes in masonry and similar material.

In the use of ordinary masonry drills, particularly in drilling horizontal holes and vertical holes from above, it has been found that there is a tendency for the pulverized masonry material to clog the hole and impede the drilling operation.

It is, therefore, an object of this invention to provide a masonry drill which cleans the hole as it operates and removes the pulverized material not only from some place back of the point but from the cutting point as well.

It is a further object to provide a masonry drill which may be operated with a rotary motion by means of tools similar to those used to rotate wood and metal cutting drills.

The objects last mentioned are, however, incidental to the primary object which is the provision of a masonry drill which operates with greater ease and efficiency than the star drills and other ordinary masonry drills previously available.

The exact nature of the invention as well as other objects and advantages thereof will clearly appear from the description of a preferred embodiment as shown in the accompanying drawing in which:

Figure 1 is a side elevational view of a drill formed in accordance with my invention.

Figure 2 is an enlarged end elevational view.

Figure 3 is an enlarged longitudinal sectional view of a portion of the point of the drill.

Referring to the drawing by characters of reference, there is shown a masonry drill comprising a shank portion 1 adapted to be gripped in the chuck of a drill or brace. Obviously this round straight shank could be replaced by a square or tapered shank adapted to be gripped in any other form of chuck. The working portion of the drill comprises a tapered body portion 2 provided with a fairly coarse thread 3 similar to that found on commercial wood screws. The pointed end of the tapered portion 2 is provided with a longitudinal slot 4 providing cutting edges which free the material being drilled and leave it in a pulverized condition to be discharged rearwardly by the threads 3. Desirable proportions for the drill may be, in relation to the diameter D of the straight shank portion, length of straight shank 4D, length of threaded portion 8D, depth of the slot D, width of the slot 0.1D. Obviously, these dimensions may be modified as circumstances or the nature of the material being drilled may require. The drill is, of course, hardened to withstand the abrasive action of the masonry material.

In operation it has been found that rotation of this drill accompanied by moderate pressure enters the drill rapidly into brickwork or other masonry in which it may be desirable to form a hole for the setting of a bolt or for any similar purpose.

I claim:

A masonry drill comprising a shank and a tapering body ending in a sharp point, a helical thread on the surface of the tapering body and extending substantially to the end thereof and a narrow parallel sided slot bifurcating the end of the body and extending through two or more of the threads to feed the cutting edges of the slot to their work.

RICHARD H. QUILLIN.